United States Patent
Veis

(10) Patent No.: US 9,282,217 B2
(45) Date of Patent: Mar. 8, 2016

(54) GENERATING DATA TO CONTROL THE EJECTION OF INK DROPS

(75) Inventor: Alex Veis, Kadima (IL)

(73) Assignee: Hewlett-Packard Industrial Printing Ltd, Netanya (IL)

( * ) Notice: Subject to any disclaimer, the term of this patent is extended or adjusted under 35 U.S.C. 154(b) by 0 days.

(21) Appl. No.: 14/350,529

(22) PCT Filed: Oct. 11, 2011

(86) PCT No.: PCT/IL2011/000806
§ 371 (c)(1),
(2), (4) Date: Aug. 18, 2014

(87) PCT Pub. No.: WO2013/054319
PCT Pub. Date: Apr. 18, 2013

(65) Prior Publication Data
US 2015/0029253 A1    Jan. 29, 2015

(51) Int. Cl.
B41J 2/155      (2006.01)
H04N 1/405    (2006.01)
H04N 1/40      (2006.01)

(52) U.S. Cl.
CPC ............. *H04N 1/405* (2013.01); *H04N 1/4057* (2013.01); *H04N 1/40087* (2013.01)

(58) Field of Classification Search
CPC ...... B41J 2/205; B41J 2/2052; G06K 15/102; G06K 15/107; G06K 15/1878; G06K 15/1881; G06K 2215/111; G06K 9/03
See application file for complete search history.

(56) References Cited

U.S. PATENT DOCUMENTS

| 6,059,404 | A | 5/2000 | Jaeger et al. |
| 6,629,739 | B2 | 10/2003 | Korol |
| 6,834,926 | B2 | 12/2004 | Shibata |
| 7,901,020 | B2 * | 3/2011 | Hoshiyama et al. ............ 347/10 |
| 2003/0090686 | A1 | 5/2003 | Fujimori |
| 2007/0182974 | A1 | 8/2007 | Hoshiyama et al. |
| 2007/0188813 | A1 | 8/2007 | Ozawa |

FOREIGN PATENT DOCUMENTS

| EP | 0628415 A2 | 12/1994 |
| EP | 1475953 A2 | 11/2004 |
| EP | 1768378 A1 | 3/2007 |
| JP | 2002370349 A | 12/2002 |

* cited by examiner

*Primary Examiner* — Lamson Nguyen
(74) *Attorney, Agent, or Firm* — HP Inc Patent Department

(57) ABSTRACT

According to one example of the present invention, there is provided a method of generating data to control the ejection of ink drops from a plurality of arrays of printhead nozzles of a printing system. In the printing system one of the arrays of nozzles is configured to eject a first ink of a first color having a first colorant density. Another one of the arrays of nozzles is configured to eject a second ink of the first color having a second colorant density. Each array of nozzles is capable of making ink marks having a plurality of different ink mark volumes on a media. The method comprises obtaining image data for a single color channel and generating, from the image data, multi-level screen data describing, for each of the first and second inks, the ink mark volume to be made by the array of printhead nozzles at each screen location.

20 Claims, 5 Drawing Sheets

GENERATING DATA TO CONTROL THE EJECTION OF INK DROPS

BACKGROUND

Current ink jet printing techniques use printheads capable of ejecting drops of ink or other fluids onto a media to generate a printed image. Common printhead technology includes thermal inkjet (TIJ) printheads and piezo-electric printheads.

Many ink jet printing systems use four primary colour inks—cyan (C), magenta (M), yellow (Y), and black (K)—in a so-called CMYK colour model.

Digital images, for example as produced by a digital camera or as represented on a visual display unit of a computing device, however, typically use different colour models, such as the red, green, and blue (RGB) colour model. In an RGB image each pixel of the image is represented by a 3-tuple (or triplet) of multi-bit values, one for each of red, green, and blue colours or channels. Many colour image formats represent each image pixel using 8 bits per colour channel. This enables 256 shades (or grey levels) to be represented per colour channel per pixel, allowing each image pixel to represent one of $256^3$ (over 16 million) possible colours.

Ink jet printheads, however, are typically only able to represent 2 grey levels per colour on a media. That is, an ink jet printhead may either eject a drop of ink onto the media, or may not eject a drop of ink onto the media. Two grey levels may be represented by just a single bit.

In order to authentically reproduce multi-bit or continuous tone images with a printer having only 4 primary ink colours, images to be printed have to be in the CMYK colour space. Images not in the CMYK colour thus have to be converted using known conversion techniques.

A halftoning process is then performed on the CMYK image data to produce, for each of the 4 primary colours, a 1-bit image known as a halftone screen. A halftone screen defines, for a particular colour ink, a two-dimensional array of spatial locations at which ink jet drops are to be placed (and hence ink marks made) on a media. The collective result of each halftone screen being printed by its associated colour printhead creates a visual illusion, when viewed at a suitable viewing distance, of continuous tone colour images.

If these ink drops can be printed at high resolution, using very small drops, such halftoning techniques can produce very high quality prints (for example, even so-called 'photo quality' prints) even when viewed from close-up. This is typically the case with small format consumer printers.

However, in large format or industrial inkjet printers the size of ink drops ejectable from a printhead are somewhat larger than those ejectable from a printhead of a typical consumer printer. For example, an industrial inkjet printer may eject drops having a volume in the range of about 35 to 160 pl, whereas office or consumer inkjet printers may eject drops having a volume in the range of about 6 to 15 pl. This is due partly because of the large numbers of print nozzles used in large format or industrial printers for printing on large widths of media. Accordingly, large format or industrial printers using of a four colour printing process may produce images that exhibit grain when viewed close-up, especially in photographic or other images having relatively light tones. Grain in light tones is due to the halftoning process having to increase the spacing between ink drops such that the combination of the media background colour (generally chosen to be white) and the printed drops creates the visual effect of a light colour tone.

In order to improve the quality of such images, to reduce grain, and provide smooth colour transitions, some large format or industrial printing systems use additional lighter colour inks in addition to the four primary CMYK colour inks. For example, some printing systems may use an additional light cyan (c) ink and a light magenta (m) ink, in a so-called CcMmYK or 6-colour model. Light yellow is typically not used as the human eye is less sensitive to light yellow. In some examples a light black (k) ink may also be used. Typically, a light colour ink will have a lower density or concentration of colorant compared to its equivalent full colour ink. In such systems, the halftoning process is extended to generate halftone screens for each of the ink colours (both full and light colour inks) available to the printing system. Thus, in a six colour printing system, six separate halftone screens would be produced.

Halftoning is well understood for use with printing systems such as those described above, and a great deal of research has been invested in deriving efficient halftoning techniques that provide high quality printed output that exhibit low noise, interference, and the like in printed images. Accordingly, halftoning technology, commonly implemented in raster image processors (RIP), is generally available at low cost and reliable.

Some modern printheads are also capable of producing ink drops of varying sizes. Combined with 4 or 6 (or greater) colour inks, such printheads may enable a significant increase in the number of grey levels producible by a printer. However, to maximize the potential of such printheads, new halftoning processes have to be designed and implemented, which is a non-trivial task.

BRIEF DESCRIPTION

Examples, or embodiments, of aspects of the invention will now be described, by way of non-limiting example only, with reference to the accompanying drawings, in which.

DETAILED DESCRIPTION

Examples, or embodiments, of various aspects of the present invention, as described herein, provide halftoning-type techniques that increase the number of grey levels obtainable in a single image spot or pixel printed on a media by a printhead or printhead nozzle. Hereinafter, such techniques are referred to as multi-level screening techniques, since the resulting screen is not just a 1-bit, or halftone, screen. The examples described herein are suitable for use with 6 or more colour printing systems, although may also be used with fewer or a greater number of coloured inks.

As used herein, the term 'full colour ink' refers to a primary colour ink of a printing system (e.g. CMYK ink) having a predetermined concentration or density of colorant. A full colour ink may be a colour having a saturated colour. A colorant may be any suitable colorant such as a pigment or a dye. The term 'light colour ink' refers to an ink having a lower concentration or density of colorant compared to its associated full colour ink. For example, a full cyan ink may have a predetermined concentration of colorant, whereas a light cyan ink may have only a fraction of the colorant concentration of the full cyan ink. Reference herein just to a 'colour' (not preceded by 'full' or 'light') will be understood to be referring to a 'full colour' unless otherwise specified.

Figure 1:
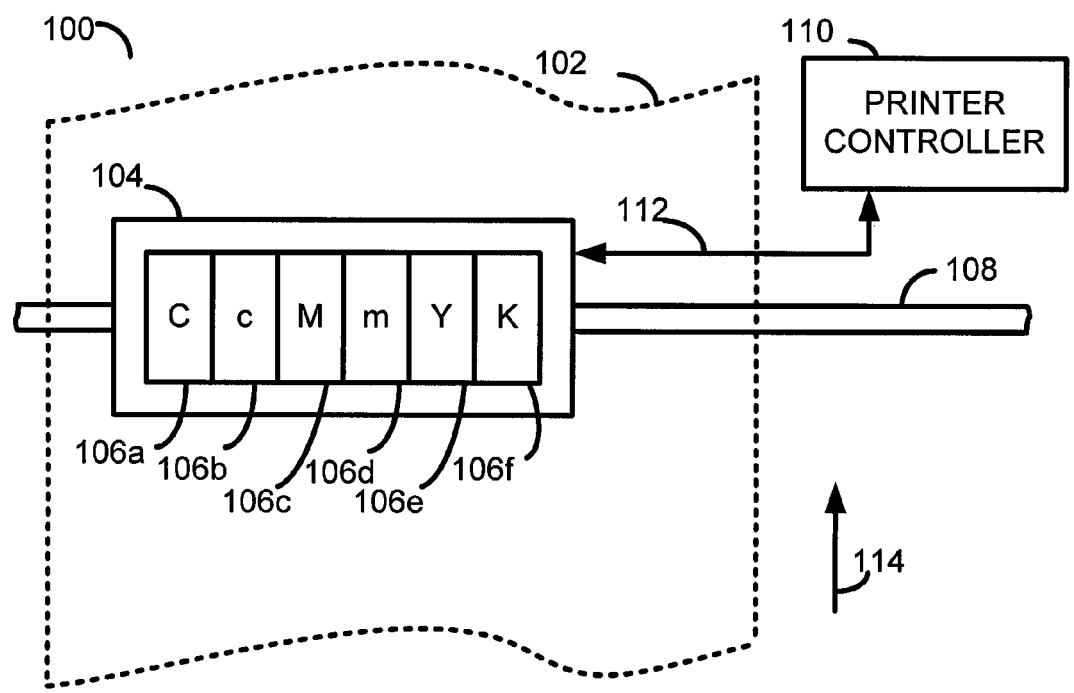
FIG. 1 is a simplified illustration showing a plan view of a printing system 100 according to one example.

Referring now to FIG. 1 there is shown a simplified block diagram of a printing system 100 according to an example of the present invention. It will be appreciated that, for clarity, not all elements of a complete printing system are shown. The printing system 100 uses an ink writing system 104 to deposit ink marks on a media 102, thereby generating a printed image on the media 102. In FIG. 1 the writing system 104 comprises a plurality of ink jet printheads 106. Each printhead is associated with a different colour ink. The ink may be contained within the printhead, or may be supplied by an external ink supply system (not shown). In the present example the writing system 104 comprises a printhead 106a for printing with cyan (C) ink, a printhead 106b for printing with light cyan (c) ink, a printhead 106c for printing with magenta (M) ink, a printhead 106d for printing with light magenta (m) ink, a printhead 106e for printing with yellow (Y) ink, and a printhead 106f for printing with black (K) ink.

In another example, a single printhead may have a plurality of arrays of inkjet nozzles of which one array may be used for ejecting a full colour ink and a second array may be used for ejecting a light colour ink. In a yet further example, a single printhead may be arranged to eject ink of each of the different colour inks used in the printing system 100.

Herein it will be appreciated that use of the term printhead can, as appropriate, be interpreted to mean an array of nozzles within a printhead.

In the present example the writing system 104 is mounted on a carriage bar 108 along which the writing system 104 may move back-and-forth, thereby enabling ink marks from different ones of the printheads 106 to be deposited across the width of the media 102. After one or multiple passes of the writing system 104 along the carriage bar 108 the media 102 is advanced, under control of the printer controller 110, in the media advance direction 114. In this way, an image may be printed on the media 102 in an incremental manner.

In other examples, however, the printing system 100 may use a different arrangement such as a page-wide array in which an array of printheads 106 span the entire width of the media 102 and in which the writing system 104 does not move, or moves just a short distance.

In other examples, a greater number of ink colours, and hence printheads 106, may be provided.

In the present example each of the printheads 106 are each capable of producing four grey levels of ink marks on a media. In other examples, however, only some of the printheads 106 are capable of producing four grey levels of ink marks on a media.

Producing four grey levels of ink marks may be achieved by a printhead 106 being capable of ejecting three different sizes or volumes of ink drop onto a media. For example, an inkjet printhead may be capable of generating ink drops having a volume of 10 pl, 20 pl, or 30 pl. In other examples a printhead 106 may be able to generate ink drops having a smaller or greater volume.

In another example, four grey levels of ink marks may be generated on a media by a printhead 106 controllable to eject zero to three ink drops onto the same spatial location of a media. For example, if the printhead is designed to eject ink drops of 10 pl, ejecting two drops onto the same spatial location will result in the substantially the same amount of ink being deposited on the media as a single 20 pl ink drop. In one example, the printhead may eject multiple ink drops in a single pass, whereas in other examples the printhead may eject multiple inks drops over multiple passes.

In further examples printheads capable of generating a larger number of grey levels may be used.

Operation of the printing system 100 is controlled by a printer controller 110.

Using a full and light coloured inks and printheads capable of generating 3 different ink mark volumes ($MV_1$, $MV_2$, $MV_3$) on a media enables 16 different grey levels to be generated for any single spatial location on a media for that colour. In the examples described herein it is assumed that each of the different ink mark volumes are multiples of the smallest drop size:

1) $MV_1 = V$
2) $MV_2 = 2V$
3) $MV_3 = 3V$ where V=drop volume.

$MV_0$ denotes no ink drop being ejected and thus a drop volume of 0.

In other examples, however, each of the different mark volumes may have different volume relationships.

Table 1 below shows how 16 grey levels can be produced according to an example.

TABLE 1

EXAMPLE OF 16 GREY LEVELS

| Grey Level | Mark Volume (MV) | |
|---|---|---|
| | Colour$_{LIGHT}$ | Colour$_{FULL}$ |
| 0 | 0 | 0 |
| 1 | 1 | 0 |
| 2 | 2 | 0 |
| 3 | 3 | 0 |
| 4 | 0 | 1 |
| 5 | 1 | 1 |
| 6 | 2 | 1 |
| 7 | 3 | 1 |
| 8 | 0 | 2 |
| 9 | 1 | 2 |
| 10 | 2 | 2 |
| 11 | 3 | 2 |
| 12 | 0 | 3 |
| 13 | 1 | 3 |
| 14 | 2 | 3 |
| 15 | 3 | 3 |

To enable each of the 16 different grey levels to be distinguishable from one another once printed the colorant density of each light colour ink has to be chosen carefully.

In the present example the colorant density of a light colour ink mark having an ink mark volume $MV_1$ is chosen to be about 8% of the corresponding full colour ink mark having an ink mark volume $MV_3$. Translating this to Table 1 gives the results shown in Table 2 below. In other examples, other colorant densities may be used for each grey level.

TABLE 2

EXAMPLE DROP VOLUMES TO GIVE 16 GREY LEVELS

| | Mark Volume (MV) | | | |
|---|---|---|---|---|
| Grey Level | Colour$_{LIGHT}$ | Colour$_{FULL}$ | Colourant Density | Delta |
| 0 | 0 | 0 | 0 | |
| 1 | 1 | 0 | 8% | 8% |
| 2 | 2 | 0 | 17% | 8% |
| 3 | 3 | 0 | 25% | 8% |
| 4 | 0 | 1 | 33% | 8% |
| 5 | 1 | 1 | 42% | 8% |
| 6 | 2 | 1 | 50% | 8% |
| 7 | 3 | 1 | 58% | 8% |
| 8 | 0 | 2 | 67% | 8% |
| 9 | 1 | 2 | 75% | 8% |
| 10 | 2 | 2 | 83% | 8% |
| 11 | 3 | 2 | 92% | 8% |
| 12 | 0 | 3 | 100% | 8% |
| 13 | 1 | 3 | 108% | 8% |
| 14 | 2 | 3 | 117% | 8% |
| 15 | 3 | 3 | 125% | 8% |

It should be noted that although grey scales 13 to 15 show a theoretical colour density of greater than 100% these grey scales remain distinguishable from one another when printed due to the fact that in ink jet printing an ink drop may not necessarily result (at least at a microscopic level) in complete coverage of the media.

In order to take advantage of printing using 16 grey scales, as described, above a new multi-level screen process is provided to convert a continuous or multi-tone image to be printed to a 4-bit (i.e. 16 greyscales) multi-tone screen, for at least those colours in the printing system that have both full and low colour density versions (i.e. in the present example for cyan and magenta inks).

Figure 2:
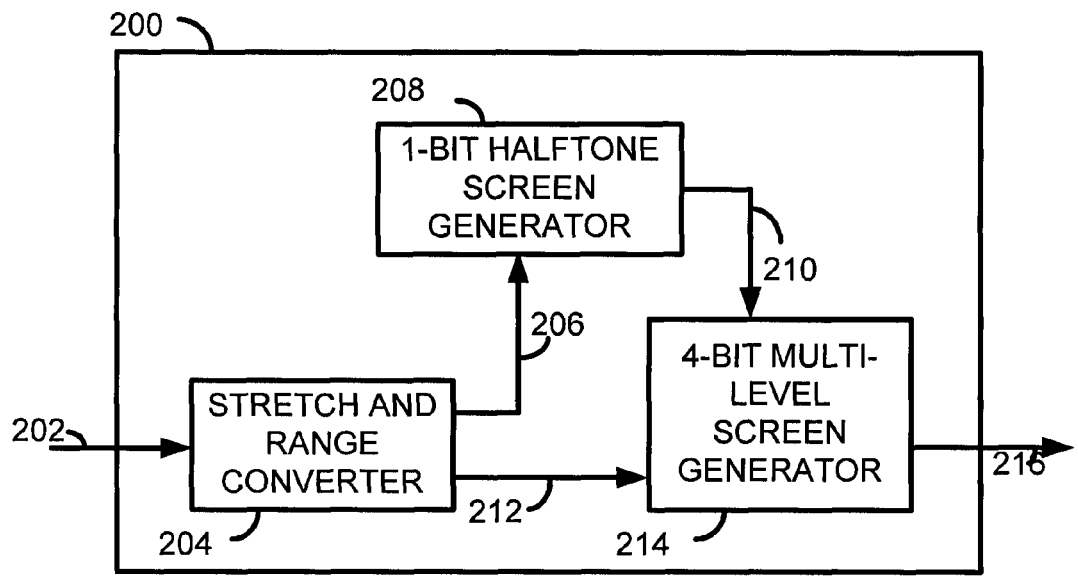
FIG. 2 is a simplified block diagram of a multi-level screen generator according an example.
Figure 3:
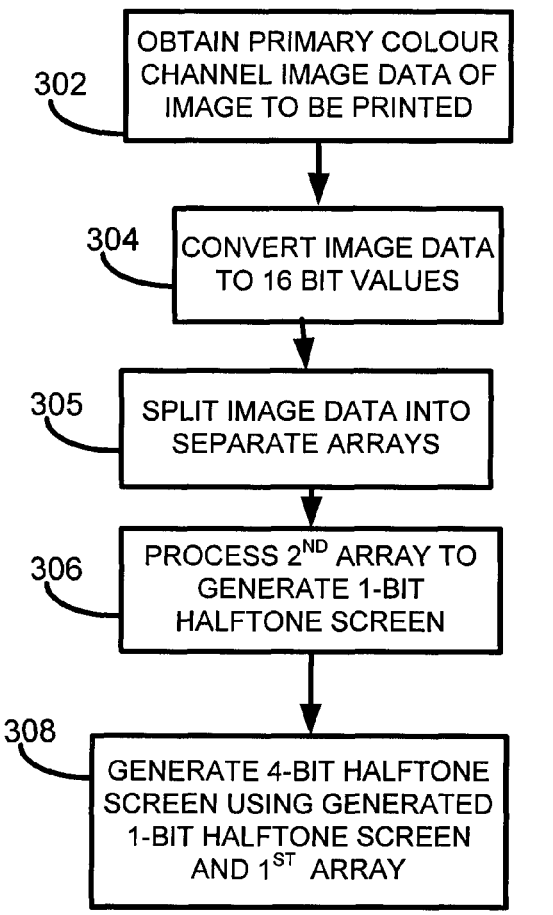
FIG. 3 is a simplified flow diagram outlining an example method of operating a halftone generator according to an example.

Referring now to FIG. 2 is shown a multi-level screen generator 200, according to one example, for generating multi-level screens from an input image. The operation of the multi-level screen generator 200 is described in further detail below with additional reference to the flow diagrams of FIGS. 3 and 4.

At 302 (FIG. 3) data 202 representing a multi-bit image data is obtained, for example from an image data file, a memory, or other appropriate storage medium. The image data 202 is colour channel separated data, having image data for each of the CMYK primary colour channels. In one example, the image data 202 is represented as a set of two-dimensional arrays, with one array used per primary colour channel. Each element of an array represents an image pixel and has a value representing the grey level of that pixel.

In the present example the image data 202 has the same resolution as the resolution of the printing system 100. The resolution may be measured in dots per inch (DPI). In other examples the image data 202 may be up-scaled or down-scaled, as appropriate, to have the same resolution as the resolution of the printing system 100.

In the present example the input image data 202 uses 8-bits for each of the CMYK channels. In other examples the input image data may use a greater or smaller number of bits per colour channel.

At 304 the convertor module 204 converts the image data for each colour channel into 16-bit image data. In other examples, the data may be stretched by other amounts, for example to 24 bits. For example, if the input image data is represented using 8-bits per colour channel per pixel the convertor module 104 stretches and performs a range conversion to convert the data for each colour channel to 16-bit data. The conversion to 16-bit data may be performed, for example, using a predetermined lookup table, such as a colour lookup table (CLUT). In one example, the convertor module 204 also performs a greyscale linearization function. The purpose of performing the stretching is to increase the resolution of the multi-level screen generation, as described herein. In one example, however, no stretching is performed if the input data 202 is of a suitable bit-depth.

The converted 16-bit data for a chosen one of the CMYK colour channels is processed in the following manner.

At 305 the converted 16-bit image data for a chosen colour channel is split into a pair of two-dimensional image arrays. Each element of each array represents a pixel of the image to be printed. A first two-dimensional array is created from the 4 most significant bits (MSB) (212) of the 16-bit input image data. A second two-dimensional array is created from the remaining least significant bits (LSB) (206) of the 16-bit input image data. Thus in the present example, the second two-dimension array comprises the 12 least-significant bits of the 16-bit input image data.

At 306 the second two-dimensional array is sent to a 1 bit halftone screen generator 208. In one example any conventional or known 1-bit halftone screen generator may be used, such as an error diffusion halftoning generator. This has the particular advantage of enabling low cost, reliable, existing halftone screening technology to be re-used. The 1-bit halftone screen generator 208 converts the value of each element or pixel in the array to a 1-bit value based on a threshold value associated with each element in the array. The actual algorithm and threshold values may vary depending on the particular 1-bit halftoning algorithm chosen. The output 210 from the 1-bit halftone screen generator 208 is a two-dimensional 1-bit array wherein each element of the array has either a value of 0 or 1.

At 308 the 4-bit multi-level screen generator 214 processes the first two-dimensional array and the 1-bit array 210 output from the 1-bit halftone generator 208 to generate a third two-dimensional array of which each element or pixel of the array is represented by a 4-bit value. In one example, the two most significant bits of each array element or pixel define an ink mark volume of a full colour, and the two least significant bits of each array element define an ink mark volume of a corresponding light colour. In another example, the two most significant bits may define an ink mark volume of a light colour, and the two least significant bits may define an ink mark volume of a full colour. In a yet further example, the 4-bit multi-level screen generator 214 generates two two-dimensional arrays, one representing 2-bit data for the full colour ink and one representing 2-bit data for the corresponding light colour ink.

Figure 4:
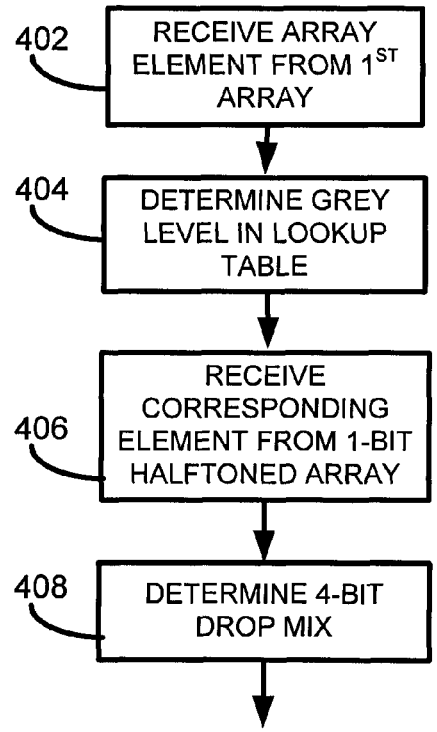
FIG. 4 is a simplified flow diagram outlining an example method of operating a halftone generator according to an example.

The operation (block 308) of the 4-bit multi-level screen generator 214, according to an example, will now be described in further detail with reference to the flow diagram of FIG. 4. In this example, the multi-level screen generator 214 uses a look-up table, as shown below in Table 3:

TABLE 3

| Example lookup table | | |
|---|---|---|
| Grey Level | Ink Mark Mix 0 | Ink Mark Mix 1 |
| 0 | 0F, 0L | 0F, 0L |
| 1 | 0F, 0L | 0F, 1L |
| 2 | 0F, 1L | 0F, 2L |
| 3 | 0F, 2L | 0F, 3L |
| 4 | 0F, 3L | 1F, 0L |
| 5 | 1F, 0L | 1F, 1L |
| 6 | 1F, 1L | 1F, 2L |

TABLE 3-continued

Example lookup table

| Grey Level | Ink Mark Mix 0 | Ink Mark Mix 1 |
|---|---|---|
| 7 | 1F, 2L | 1F, 3L |
| 8 | 1F, 3L | 2F, 0L |
| 9 | 2F, 0L | 2F, 1L |
| 10 | 2F, 1L | 2F, 2L |
| 11 | 2F, 2L | 2F, 3L |
| 12 | 2F, 3L | 3F, 0L |
| 13 | 3F, 0L | 3F, 1L |
| 14 | 3F, 1L | 3F, 2L |
| 15 | 3F, 2L | 3F, 3L |

Table 3 defines, for each of the previously described 16 grey levels, a set of ink mark combinations. In the present example a pair of ink mark combinations, drop mix 0 and drop mix 1, are defined. In other examples a greater number of ink mark combinations may be defined.

Each ink mark combination defines a combination of full and light ink drops, and the volume of those ink drops. In Table 3 this is represented in the form:

xF, yL where x represents the volume of a full colour drop F, and where y represents the volume of a light colour drop L.

At 402 the 4-bit multi-level screen generator 214 receives a first element or pixel of the first array. At 404, the 4-bit multi-level screen generator 214 chooses a grey level in the lookup table (Table 3) based on the 4-bit value of the received element or pixel.

At 406 the 4-bit multi-level screen generator 214 receives a corresponding array element of the 1-bit array 210. At 408, based on the 1-bit value of the corresponding array element or pixel, the 4-bit multi-level screen generator 214 chooses (408) either the first or the second drop mix for the determined grey scale, as shown in Table 3.

For example, if an element or pixel of the first array has the 4-bit binary value '1100', and the corresponding element of the 1-bit halftoned array is '0', this will cause the grey level 12 for the current element or pixel to be printed with a mix of 2 full drops and 3 light drops. If the corresponding element of the 1-bit array is '1', this will cause the grey level 12 for the element or pixel to be generated with a mix of 3 full drops and no light drops. Each element or pixel of input data for the chosen colour channel of the input image is processed in this way to generate 4-bit multi-level screen or screen data 216.

The process 306 and 308 may then be repeated for other ones of the colour channels. In one example, the process 306 and 308 is repeated for other colour channels in the printing system. In one example, the process may be performed for the cyan and magenta colour channels. In another example, the process may be performed for all colour channels, including those colour channels (if any) that do not have both full and light colour inks. In a further example, those colour channels (if any) that do not have both full and light colours are not processed in accordance with process 302 to 308, but are processed by a conventional 1-bit halftone screen generator.

The generated 4-bit multi-level screen or screens 216 may then used by the printer controller 110 to control the operation of the ink writing system 104 to eject the appropriate volume of ink, for the appropriate ink colour, at the appropriate spatial media location on a media.

One advantage of the above-described techniques is that in one example only a single multi-level screen is used for each full and light colour ink pair. For example, a single multi-level screen is generated that covers both full cyan and light cyan ink. Thus, a single multi-level screen may be used to control the output of ink drops from more than one ink jet printhead or array of printhead nozzles. This is particularly advantageous as a reduced number of screens facilitates the alignment of printed screens.

A further advantage of the above-described techniques is that lower grain and lower contrast printed images may be generated, as will be described below.

Figure 5:
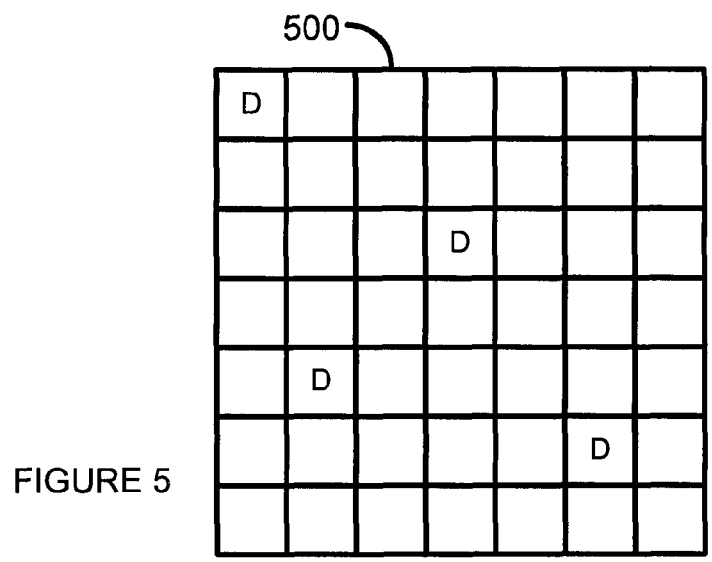
FIG. 5 is an illustration of a portion of a screen matrix according an example.

Referring now to FIG. 5, there is shown a portion of 1-bit halftone screen matrix 500 having 7 by 7 pixels. In this example, a conventional printing system prints an ink drop in each of the locations identified by D. If the ink used for printing the matrix is a full colour or saturated colour ink, the matrix 500 would be perceived by a viewer as a grey scale of about 8% (4 spatial locations filled out of 49 available spatial locations). Other 1-bit halftoning techniques may result in a different fill pattern of the screen matrix 400 to represent the same grey level.

One problem, however, with the fill pattern of screen matrix 400 is that the resulting matrix has a high contrast since the matrix is comprised of pixels of full colour density ink and no ink. As previously mentioned, in large format and industrial printing such images can appear grainy when viewed close-up.

Using the above-described multi-level screen generator techniques lower contrast, and lower grain, images may be generated. This may lead to significant improvement in perceived image quality, especially in areas of flat or substantially flat colour, in linear grey scales, or the like, as described below.

Figure 6:
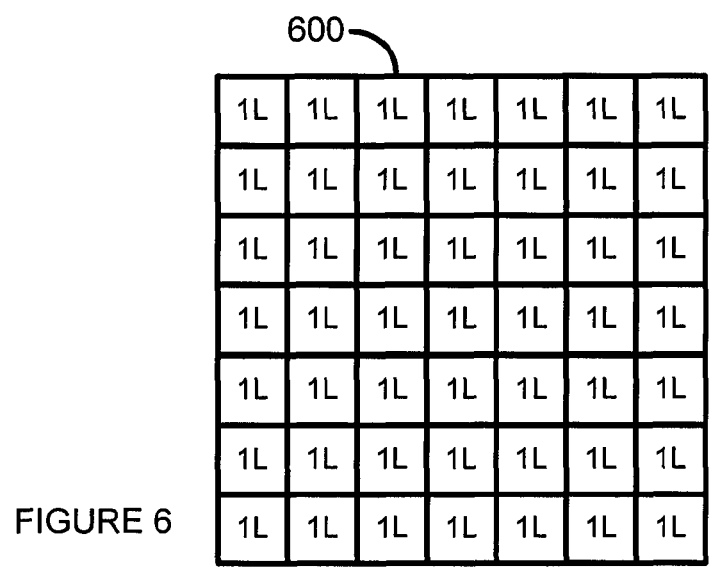
FIG. 6 is an illustration of a portion of a screen matrix according an example.

Referring to FIG. 6 is shown a portion of a halftone screen matrix 600 having 7 by 7 pixels. As determined by the above-described multi-level screen generator techniques, each spatial location of the matrix 600 has one light ink drop 1 L deposited thereon. As shown above in Table 2, each light ink drop has an 8% colour density. The resulting filled matrix 600 therefore represents an 8% grey level when viewed at a suitable viewing distance. Advantageously, the screen matrix 600 has zero contrast, since each spatial location within the matrix is filled, and is filled in the same manner. This translates into a very low-grain image.

Figure 7:
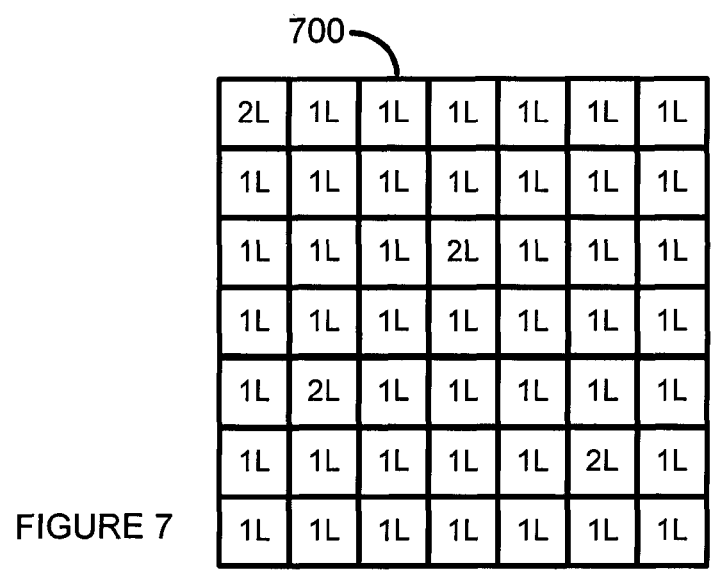
FIG. 7 is an illustration of a portion of a screen matrix according an example.

FIG. 7 shows a further example of a 7 by 7 pixel halftone screen matrix 700. The grey level represented by the matrix of FIG. 7 is about 8.7%. The screen matrix 700 comprises 45 single light drops, each having a colour density of 8%, and 4 double light drops each having a colour density of 16%. The image area presented by the matrix 700 is of low contrast, since the maximum colour density difference between pixels in the matrix is only 8%.

A yet further advantage of the herein described techniques is that successive grey levels may generated using only minimally distanced colours, as shown in FIG. 7. For example, grey scale 2 (17% density—see Table 2 above) may be generated using a mix of 0 full drops with 1 light drop, and 0 full drops with 2 light drops, as illustrated in FIG. 7.

Figure 8:
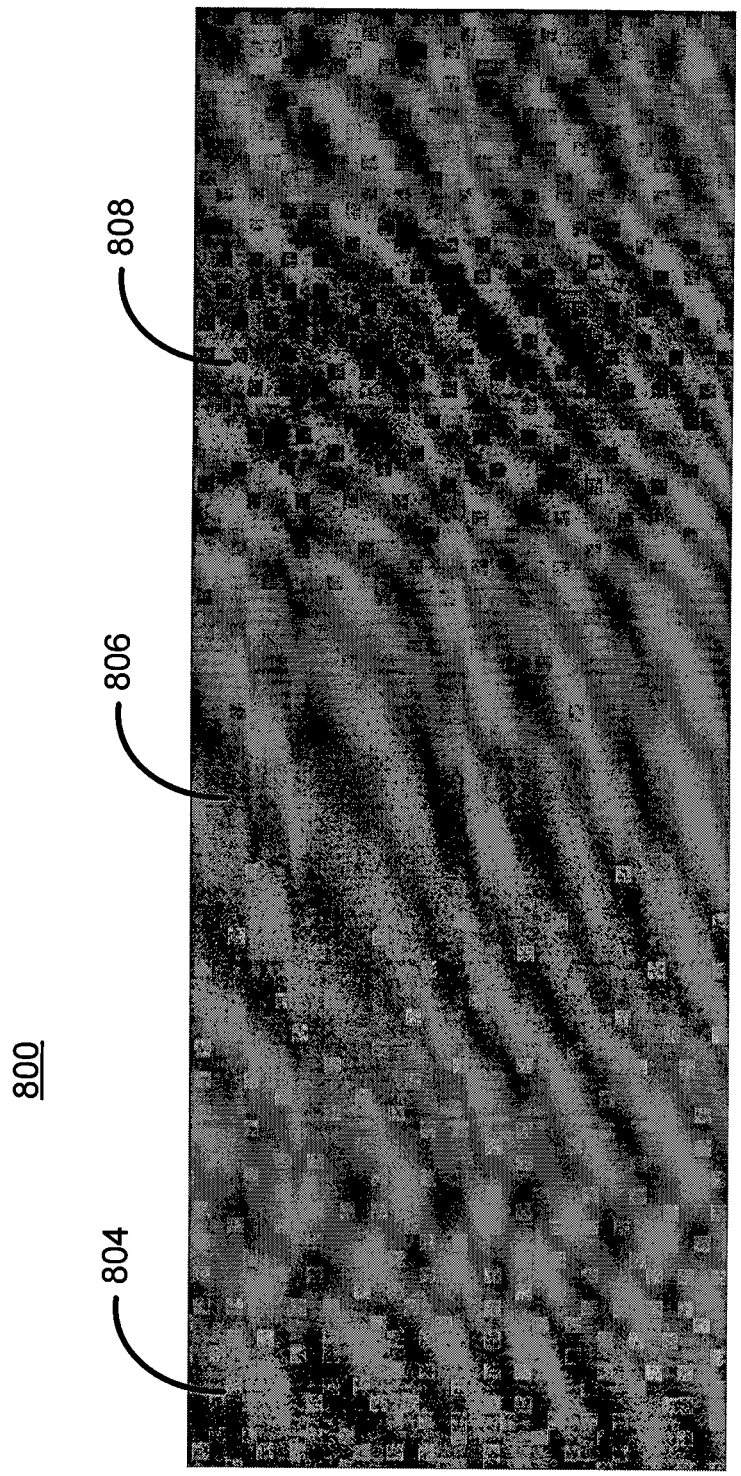
FIG. 8 is a graphical representation of a portion of a printed image printed according to an example.

The effect of this is shown more clearly in the graphical representation of a printed image 800, shown in FIG. 8. The printed image 800 represents part of a linear grey scale, going from light on the left-hand side, to dark on the right hand side. A first area 804 is printed with a mix of ink drops that have a maximum colour density difference of only 8%. A second area 806 is printed with a mix of ink drops having the same colour density. A third area 808 is again printed with a mix of ink drops that have a maximum colour density difference of only 8%. Accordingly, the contrast of the different areas of the image 800 is either low or zero.

In one example, the above-described techniques may be performed by the printer controller 110 of the printing system 100. In another example, the above-described multi-level toning techniques may be performed by a raster image processor (RIP). In another example, the above-described techniques may be performed by a printer driver.

Figure 9:
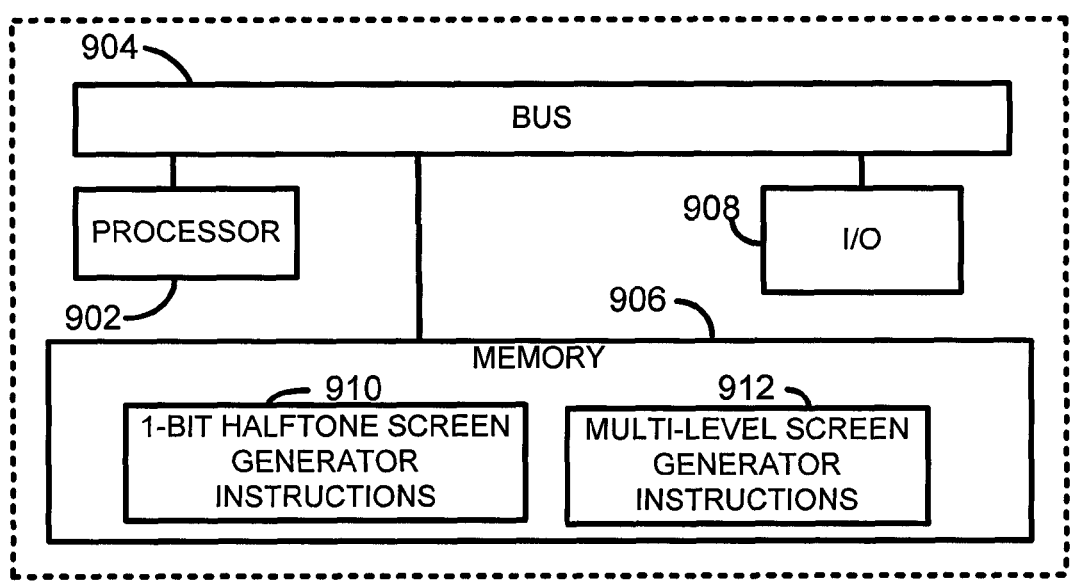
FIG. 9 is a simplified block diagram illustrating an implementation of a multi-level screen generator according to an example of the present invention.

In a further example, as illustrated in FIG. 9, at least part of a multi-level screen generator, such as the multi-level screen generator 200, may be implemented using a microprocessor 902 coupled, via a communication bus 904, to a memory 906 and an input/output module 908. The memory 906 stores multi-level screen generator instructions comprising 1-bit halftone screen generator instructions 910 and multi-level screen generator instructions 912. The instructions 910 and 912 are processor understandable instructions that when executed by the processor 902 provide functionality of a multi-level screen generator as described herein.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A method of generating data to control the ejection of ink drops from a plurality of arrays of printhead nozzles of a printing system, one of the arrays of nozzles to eject a first ink of a first colour having a first colorant density, and one of the arrays of nozzles to eject a second ink of the first colour having a second colorant density, each array of nozzles capable of making ink marks having a plurality of different ink mark volumes on a media, the method comprising:
   obtaining image data for a single colour channel; and
   generating, from the image data, multi-level screen data describing, for each of the first and second inks, the ink mark volume to be made by the array of printhead nozzles at each ink mark location;
   wherein generating multi-level screen data further comprises:
       performing 1-bit halftone screening on a first portion of the image data to generate 1-bit halftone screen data; and
       generating the multi-level screen data from a second portion of the image data and the generated 1-bit halftone screen data.

2. The method of claim 1, wherein the obtained image data is a two-dimensional array of image data with each element of the array representing a pixel of the image, wherein performing 1-bit halftone screening comprises generating a two-dimensional array with each element of the array having a 1-bit value representing a pixel of the image, and wherein generating multi-level screen data comprises generating a two-dimensional array with each element of the array having an N-bit value representing a pixel of the image.

3. The method of claim 2, wherein the second portion of the image data is the four most significant bits of each pixel of the image data, and wherein the first portion of the image data is the remaining bits of each pixel of the image data.

4. The method of claim 2, wherein generating the multi-level screen data corresponding to a pixel of the image comprises:
   using, the second portion of the image pixel data to select a plurality of ink mark combinations from a plurality of sets of predetermined ink mark combinations, each ink mark combination describing an ink mark volume for the first and second inks; and
   using the generated 1-bit halftone screen data corresponding to the image pixel to select one of the selected plurality of ink mark combinations.

5. The method of claim 4, wherein each plurality of ink mark combinations comprises a first ink mark combination and a second ink mark combination, and where the difference in colour density between each plurality of first and second ink mark combinations is a predetermined colour density.

6. The method of claim 4, wherein the plurality of ink mark combinations are described in a look-up table and wherein generating the multi-level screen data comprises using the second portion of the image pixel data and the generated 1-bit halftone screen data to select an ink mark combination from the look-up table.

7. The method of claim 1, comprising receiving image data in a cyan, a magenta, a yellow, and a black colour channel, and generating multi-level screen data for each of the cyan, magenta, yellow, and black colour channels.

8. The method of claim 1, wherein obtaining image data obtains image data at the same resolution as the resolution of the printing system.

9. A tangible, machine-readable medium that stores machine-readable instructions executable by a processor to, when executed by the processor:
   control the ejection of ink drops from a plurality printheads, one of the printheads to eject a first ink of a first colour having a first colorant density, and one of the printheads to eject a second ink of the first colour having a second colorant density, each printhead to make ink marks having a plurality of different ink mark volumes on a media,
   obtain image data for a single colour channel;
   generate multi-level screen data describing, for each of the first and second inks, the ink mark volume to be made by the array of printhead nozzles at each screen location, the generation being based on obtained image data;
   generate a 1-bit halftone screen from a first portion of the obtained image data, the 1-bit halftone screen having the form of a two-dimensional array with each element in the array having a 1-bit value representing a pixel of the obtained image.

10. The tangible machine readable medium of claim 9, further comprising
   machine readable instructions to generate multi-level screen data from a second portion of the image data and the generated 1-bit halftone screen data.

11. The tangible machine readable medium of claim 10, further comprising:
   machine readable instructions to obtain image data in a two-dimensional array with each element in the array representing a pixel of the obtained image;
   machine readable instructions to generate multi-level screen data in the form of a two-dimensional array where each element of the array has an N-bit value representing a pixel of the image.

12. The tangible machine readable medium of claim 10, further comprising:
   machine readable instructions to select, using the second portion of the image pixel data, a plurality of ink mark combinations from a plurality of sets of predetermined ink mark combinations, each ink mark combination describing an ink mark volume for the first and second inks; and machine readable instructions to select, using the generated 1-bit halftone screen data corresponding to the image pixel, one of the selected plurality of ink mark combinations.

13. The tangible machine readable medium of claim 9, further comprising:

machine readable instructions to receive image data in a cyan and a magenta colour channel, and to generate multi-level screen data for each of the cyan and magenta colour channels.

14. A printing system to generate data to control the ejection of ink drops from a plurality of arrays of printhead nozzles of a printing system, one of the arrays of nozzles to eject a first ink of a first colour having a first colorant density, and one of the arrays of nozzles to eject a second ink of the first colour having a second colorant density, each array of nozzles capable of making ink marks having a plurality of different ink mark volumes on a medias;

the printing system comprising a processor to:

obtain image data for a single colour channel; and generate, from the image data, multi-level screen data describing, for each of the first and second inks, the ink mark volume to be made by the array of printhead nozzles at each ink mark location;

wherein generating multi-level screen data further comprises:

performing 1-bit halftone screening on a first portion of the image data to generate 1-bit halftone screen data; and generating the multi-level screen data from a second portion of the image data and the generated 1-bit halftone screen data.

15. The system of claim 14, wherein the obtained image data is a two-dimensional array of image data with each element of the array representing a pixel of the image;

wherein performing 1-bit halftone screening comprises generating a two-dimensional array with each element of the array having a 1-bit value representing a pixel of the image, and wherein the generating multi-level screen data comprises generating a two-dimensional array with each element of the array having an N-bit value representing a pixel of the image.

16. The system of claim 15, wherein the second portion of the image data is the four most significant bits of each pixel of the image data, and wherein the first portion of the image data is the remaining bits of each pixel of the image data.

17. The system of claim 15, wherein generating the multi-level screen data corresponding to a pixel of the image comprises:

using, the second portion of the image pixel data to select a plurality of ink mark combinations from a plurality of sets of predetermined ink mark combinations, each ink mark combination describing an ink mark volume for the first and second inks; and using the generated 1-bit halftone screen data corresponding to the image pixel to select one of the selected plurality of ink mark combinations.

18. The system of claim 17, wherein each plurality of ink mark combinations comprises a first ink mark combination and a second ink mark combination, and where the difference in colour density between each plurality of first and second ink mark combinations is a predetermined colour density.

19. The system of claim 17, wherein the plurality of ink mark combinations are described in a look-up table and wherein generating the multi-level screen data comprises using the second portion of the image pixel data and the generated 1-bit halftone screen data to select an ink mark combination from the look-up table.

20. The system of claim 17, wherein the first colorant density of the first colour and the second colorant density of the first colour comprises a density difference of 8%.

* * * * *